(12) United States Patent
Vasileva et al.

(10) Patent No.: US 10,810,073 B2
(45) Date of Patent: Oct. 20, 2020

(54) METHOD AND SYSTEM FOR EVALUATION OF A FAULTY BEHAVIOUR OF AT LEAST ONE EVENT DATA GENERATING MACHINE AND/OR MONITORING THE REGULAR OPERATION OF AT LEAST ONE EVENT DATA GENERATING MACHINE

(71) Applicant: Liebherr-Werk Nenzing GmbH, Nenzing (AT)

(72) Inventors: Zornica Vaskova Vasileva, Feldkirch (DE); Michael Kocher, Sulz (AT); Christian Borgelt, Oviedo (ES)

(73) Assignee: LIEBHERR-WERK NENZING GMBH, Nenzing (AT)

( * ) Notice: Subject to any disclaimer, the term of this patent is extended or adjusted under 35 U.S.C. 154(b) by 119 days.

(21) Appl. No.: 15/791,266

(22) Filed: Oct. 23, 2017

(65) Prior Publication Data
US 2019/0121686 A1    Apr. 25, 2019

(51) Int. Cl.
*G06F 11/07*    (2006.01)

(52) U.S. Cl.
CPC ........ *G06F 11/079* (2013.01); *G06F 11/0736* (2013.01); *G06F 11/0751* (2013.01); *G06F 11/0778* (2013.01); *G06F 11/0784* (2013.01); *G06F 11/0787* (2013.01)

(58) Field of Classification Search
CPC .............................. G06F 11/07; G06F 11/079
USPC ......................................................... 714/37
See application file for complete search history.

(56) References Cited

U.S. PATENT DOCUMENTS

| | | | |
|---|---|---|---|
| 6,625,589 B1* | 9/2003 | Varma ................ | G05B 23/0289 700/79 |
| 6,826,569 B2* | 11/2004 | Robertson ............... | G06F 17/10 |
| 8,074,115 B2* | 12/2011 | Stolfo ................. | G06F 11/3652 714/38.1 |
| 10,127,293 B2* | 11/2018 | Chode ..................... | G06F 16/27 |
| 2002/0107841 A1* | 8/2002 | Hellerstein ............. | G06K 9/62 |
| 2003/0130991 A1* | 7/2003 | Reijerse ................ | G06F 16/284 |
| 2005/0242169 A1* | 11/2005 | Michal, III .......... | G05B 19/128 235/375 |
| 2006/0184529 A1* | 8/2006 | Berg .................... | G06F 11/0709 |

(Continued)

*Primary Examiner* — Kamini B Patel
(74) *Attorney, Agent, or Firm* — McCoy Russell LLP

(57) ABSTRACT

A method for evaluation of faulty behavior of at least one event-data-generating machine including a data logging device for providing event data, comprising: transferring logged event data, the logged event data representing a sequence of events, from the event-data-generating machines to a central processor, mining multi-dimensional sequential patterns and/or mining multi-dimensional sequential rules and/or mining anomalies and/or exceptions within the transferred event data wherein the event data additionally comprises at least one dimensional attribute holding information indicating the event-data-generating machine or at least one event-data-generating machine property; the difference between timestamps of first and last events included in an identified sequential pattern and/or sequential rule and/or anomaly and/or exception may not exceed a predefined time window; and storing at least one reference sequential pattern, sequential rule and/or anomaly and/or exception as an output of the mined multi-dimensional sequential patterns and/or sequential rules, and/or anomalies and/or exceptions in a central database.

20 Claims, 1 Drawing Sheet

(56) References Cited

U.S. PATENT DOCUMENTS

| | | | |
|---|---|---|---|
| 2008/0033895 A1* | 2/2008 | Sakurai | G06F 16/90348 |
| | | | 706/13 |
| 2012/0198277 A1* | 8/2012 | Busser | H04L 63/1416 |
| | | | 714/26 |
| 2014/0115002 A1* | 4/2014 | Kocher | G06F 11/3013 |
| | | | 707/776 |
| 2014/0207820 A1* | 7/2014 | Lee | G06F 16/2465 |
| | | | 707/776 |
| 2014/0324865 A1* | 10/2014 | Mizutani | G06F 11/0703 |
| | | | 707/737 |
| 2015/0154501 A1* | 6/2015 | Boddhu | G06F 16/951 |
| | | | 706/52 |
| 2017/0032016 A1* | 2/2017 | Zinner | G06Q 10/063 |
| 2017/0102978 A1* | 4/2017 | Pallath | G06F 11/0709 |

* cited by examiner

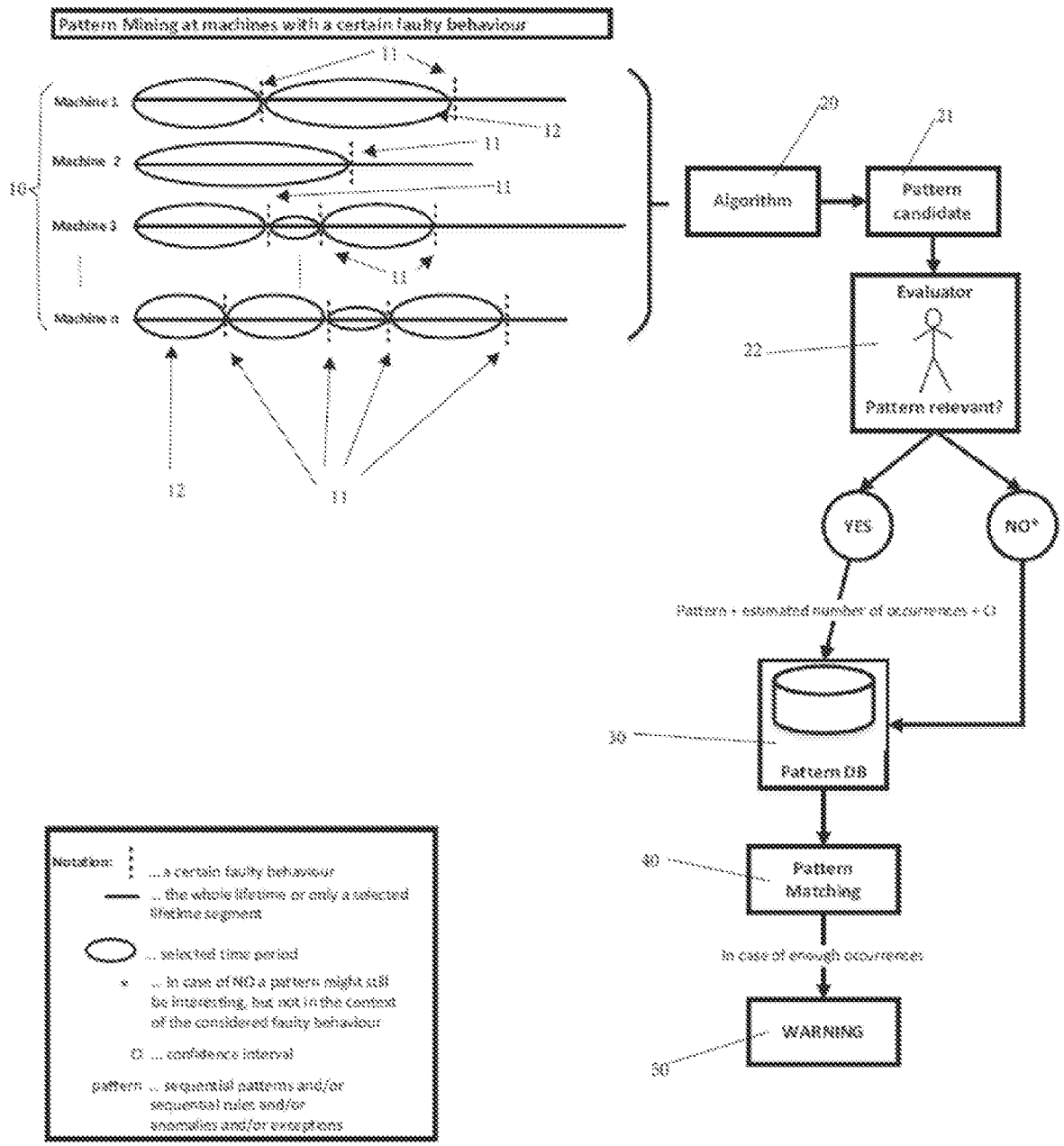

METHOD AND SYSTEM FOR EVALUATION OF A FAULTY BEHAVIOUR OF AT LEAST ONE EVENT DATA GENERATING MACHINE AND/OR MONITORING THE REGULAR OPERATION OF AT LEAST ONE EVENT DATA GENERATING MACHINE

TECHNICAL FIELD

The present disclosure refers to a method and system for evaluation of a faulty behavior of at least one event-data-generating machine and refers to a method for monitoring the regular operation of at least one event-data-generating machine. Such machine is for instance a construction or a hoisting machine having data logging means for providing event data.

BACKGROUND AND SUMMARY

These days, acquiring data is more popular than ever before. It ranges from commercial applications, e.g. super market transactions, stock market recordings to scientific data collections, such as genome analysis, astronomy and weather observations or nuclear experiments, to name a few. Hence, data appears in many forms and grows explosively.

Nowadays, companies and organizations generate terabytes of event data on a daily basis. For instance, state of the art machines, such as constructing or hoisting machines, employ a data logging software on its PLC (Programmable Logic Controller), that records event data generated by running programs and sensors. This data enables skilled persons to monitor the status of the machine. Hence, the ability to store and monitor event data records on a permanent basis has become a necessity for detecting malicious behavior, hazard states and other security issues.

Due to its magnitude and to its complex nature, the analysis of data is no longer feasible by a human being. Therefore, it is desirable to provide methods for automatically monitoring and analysing the collected event data in order to observe performance degradation or technical issues of the monitored machines.

At the moment, several methods and algorithms exist that detect or mine interesting relations, patterns and hidden knowledge in our data. The formal term for this process of extracting interesting, non-trivial, implicit, previously unknown and potentially useful information or patterns from large information repositories, e.g. a database, is denoted as data mining.

Data mining forms the core process of Knowledge Discovery in Database (KDD). KDD consists of three consecutively applied processes. A first step is called pre-processing and implements data cleansing, integration, selection and transformation methods. Then, the main process, i.e. data mining, applies different algorithms to detect implicit knowledge. Finally, the post-processing step evaluates the mining results according to the user given constraints and requirements.

In case the data has a temporal or sequential nature, i.e. the order in which the elements appear is relevant, a set of special algorithms is designed to detect sequential patterns.

Many known methods for monitoring machines only involve mining of a single dimension event data making it difficult to find common patterns in a selection of machines or similar patterns for machines of a product family. Further, a limitation of simple sequential pattern mining is that there is no assessment of the probability that a certain pattern will be followed.

It is one object of the present disclosure to improve and extend existing methods for evaluating faulty behavior of machines and for monitoring machines, in particular to adapt these methods for being applicable to machine fleets with different but similar machine types. It is a further object of the present disclosure to provide a system for centrally monitoring and diagnosing machine events and machine states in order to improve customer service.

In accordance with the present disclosure, one object is solved by a method for evaluation of faulty behavior of at least one event-data-generating machine including a data logging device for providing event data, the method comprising: transferring logged event data, the logged event data representing a sequence of events, from at least one of the event-data-generating machines to a central processor, mining multi-dimensional sequential rules within the transferred event data wherein the event data additionally comprises at least one dimensional attribute holding information indicating the event-data-generating machine or at least one event-data-generating machine property; and storing at least one reference sequential rule as an output of the mined multi-dimensional sequential rules in a central database.

Accordingly, there is provided a method for evaluation of faulty behavior of at least one event-data-generating machine, in particular a construction or hoisting machine. The method may be applicable for a plurality of machines, such as a machine fleet, having identical and/or at least two different but similar machines. All or at least a part of said machines has data logging means for providing event data. For instance, said machine, such as constructing or hoisting machine, employs a data logging software on its machine control that records event data generated by executed applications, functions and programs thereon and/or provided by sensors as measuring results. The machine control can be a Programmable Logic Controller (PLC) executing a data logging software.

At least one machine may be a port crane or a deck crane.

The inventive method comprises the steps of
transferring logged event data, the logged event data representing a sequence of events, from at least one of the event-data-generating machines to a central processor,
mining multi-dimensional sequential rules within said transferred event data wherein the event data additionally comprises at least one dimensional attribute holding information indicating said event-data-generating machine or at least one event-data-generating machine property; and
storing at least one reference sequential pattern as an output of the mined multi-dimensional sequential rules in a central database.

The central processing unit is part of a central computer, which may be a portable or a laptop computer or a mainframe or a network server or another computer configuration. At least between one machine and said central processing unit a communicative connection is permanently established or can be temporarily established for data transfer. The connection can be based on wireline or wireless connection using an own or present network, in particular a mobile communication network.

The multi-dimensional attributes hold the information indicating said event-data-generating machine or at least one machine property. For instance at least one attribute contains information on the product family of the event-data-generating machine. Mining multi-dimensional sequential rules enables the central processor to detect rules in a selection of machines and/or similar rules within a product family and/or different product families having similar rules.

Instead of regular pattern mining the inventive method suggest mining for multi-dimensional sequential rules. Thereby, the probability that a certain pattern will be followed can be taken into account. For instance, a sequential rule is a rule of the form A→B where A and B are events or sets of events or sequences of events, later on also denoted as logitems. A rule A→B is interpreted as if event(s) included in A occur (in case A is a sequence: in the time order in which they occur in A) and will be followed by the event(s) of B afterwards (likewise respecting the time order of the events in B if B is a sequence). Such information may be extremely important to predict certain behavior of the machine in the near future, in particular to estimate the likelihood of occurrence of a certain failure of the machine or a machine component.

Multi-dimensional sequential rule mining is also applicable for evaluation of identical or similar machines. By adding at least one attribute into the event data sequences it is possible to describe the type and properties of machines supporting the mining of rules and/or respective reference patterns. For example, the sequence rules and/or patterns hold information about the event itself. Adding more attributes to the multi-dimensional rules/patterns helps to provide additional information about the machine itself, for example at least one attribute describes the machine type, in particular a constructing or hoisting machine, at least one attribute identifies the membership to a special machine family, at least one attribute references the pattern to a special machine part, such as the machine drive, hydraulic system, mechanical parts, hoisting gear, etc.

By means of multi-dimensional sequential rules mining all relevant relations/patterns within the event data can be detected. These rules and/or patterns present a salient part of the data that needs to be analysed.

After identification of sequential rules the respective sequential rules/patterns may be stored at a central database as a reference sequential pattern for subsequent use, for instance for monitoring regular operation of at least one event-data-generating machine. Only new rules and patterns are stored in the database to avoid double database entries. For instance, the events/event sets/event sequences contained within an identified sequential rule may be stored as a reference sequential pattern in the database. Therefore, it is possible to identify the correlation between the patterns and the hardware of the machine generating event data and thus provide an automatic approach to preventive maintenance.

In an advantageous aspect of the present disclosure the step of mining multi-dimensional sequential rules identifies sequential rules which combination of events/event sets/event sequences appears with a minimum frequency and a minimum confidence within the mined event data, also expressed as the support and the confidence of the rule. The support of a rule describes how often a first event or a first event set is followed by second event or event set within the total amount of mined event data. The confidence of a certain rule is the aforementioned support of the rule divided by the total number of occurrences of the first events or first event sets within the total amount of mined event data. It can be understood as the conditional probability that a first event/event set is followed by the second event/event set/event sequences.

An appropriate sequential rule mining algorithm will output all sequential rules having a certain support and a certain confidence, optionally no less than some thresholds set by a user. The mined rules are stored at the central database as reference rules/patterns for subsequent use, in particular together with its support and confidence.

The general form of event data logged by at least one machine and transferred to said central processing unit consist advantageously of at least one of the following information fields: Event ID, Timestamp, Type of Event and Boolean values or values cohering with the event.

The Event ID can be a unique number referencing an entry of event data into the log file. In principle, the event ID is a consecutive number for the temporally occurring events.

The timestamp gives the exact time of a single event and the "Type of Event" field gives a short description of the occurred and logged event.

An optional field containing a Boolean value can be added for providing additional status information about the event. Such Boolean value might be a flag as "Is event First After Boot" with values "True" or "False" indicating that said event occurred right after a machine restart. The Boolean value also might give information of whether this event is the first one since booting the machine.

Further, said event data can also contain a value field wherein the according value coheres with the event.

A single event record might hold information on the event that occurred on the machine in question at the date, given by the timestamp, plus values describing the event in more detail. E.g. at a special timestamp, the Load Spectrum Counter (LSC) of a hoisting machine were read out, plus the actual values of the LSC. Hence, the event data shows a history of states the machine was in.

For further prosecution of the logged and transferred data it is transformed to a sequence database. Basically, an event data, as described above, simply represents one long sequence. Each occurred event stands for a single item of said sequence. Some items or rather events might be combined to an itemset or eventset. A sequence database consists of several sequences wherein each row of said sequence database can represent a sequence.

A number of several subsequences is obtained by splitting said long sequence, basically all occurred and logged event data. Splitting the long sequence of event data into at least two subsequences representing single entries of the sequence database wherein each subsequence may form a row of said sequence database.

Said data conversion of event data into a sequence database is applied to prepare the recorded event data for the subsequent process of data mining. A certain data structure such as a sequence database can be convenient for executing data mining algorithm.

The splitting can be triggered by logical interruptions, such as a machine restart or a restart of the respective machine or controller parts. Alternatively or additionally, the splitting can be triggered by causal interruptions, in particular a time interval with no occurring events wherein the time interval exceeds a given time threshold.

Said sequence database is referred to as a multi-dimensional sequence database when additional attributes are added to said sequences stored in said database. One possibility for adding multi-dimensional attributes is to form a multi-dimensional database wherein each row represents a multidimensional sequence which consists of the dimensional information of the sequence or rather subsequence.

Alternatively, it is possible to embed the additional multi-dimensional attributes as new itemsets into the sequences or rather subsequences, called MD-extension of the sequences.

It can be particularly advantageous when the step of mining multi-dimensional sequential rules considers the temporal order of the events/event sets/event sequences included in the rule. That is to say that for identification of sequential rules it is important that the events/event sets/event sequences occurred in identical temporal order otherwise the occurrence of the respective events/event sets/event sequences will not be considered as the same rule.

Furthermore, it may be conceivable to restrict the time interval during which the events considered for a sequential rule must have been occurred. That is to say the difference between the timestamps of the first and last event included in an identified sequential rule may not exceed a predefined time window. The time interval may be flexibly set by user request and/or could be different for each machine and/or machine type.

In another advantageous aspect of the disclosure the event data transferred to the central processor may additionally mined for multi-dimensional sequential patterns and/or sequential rules and/or anomalies and/or exceptions with/or without time window constraints. With regard to multi-dimensional sequential mining reference is made to U.S. patent application Ser. No. 13/658,438 which disclosure is fully incorporated into the present application by reference.

Since it may be desired to identify sequence rules which could be used as an indicator for an imminent machine failure it is advantageous to consider (mine) only event data generated by at least one event-data-generating machine showing a faulty behavior, in particular a certain failure of at least one machine component and/or a creation of at least one certain error message. It is possible to mine event data which has been logged by the machine right before, during or right after the occurrence of the machine failure or faulty behavior. It is also advantageous to perform the method for several differing types of machine failures in order to build up the central database for subsequent use during regular monitoring of respective machines.

It is conceivable that the method considers/mines only event data generated by event-data-generating machines showing identical or similar faulty behavior for mining multi-dimensional sequential rules and/or mining multi-dimensional sequential patterns and/or mining anomalies and/or exceptions. After identification of respective rules/patterns/anomalies/exceptions event data of further machines showing a different faulty behavior is mined, i.e. a mixing of event data generated by machines with different faulty behavior for pattern/rule mining is avoided.

For optimization of the quality of the respective sequential rules/patterns it is suggested considering only event data generated by at least one event-data-generating machines showing identical or similar faulty behavior during its switch-on cycle. It is mandatory, that the faulty behavior occurs at least for one time during a switch-on cycle of the machine, for instance a creation and display of a certain failure indication.

After identification of the sequential rule/pattern and before the step of storing a reference sequential pattern a technical relationship between the at least pattern/rule and the known faulty behavior of the event-data-generating machine is determined. In particular, a causal relationship between the occurrence of the pattern/rule and the occurrence of machine failure should be rated, i.e. whether the machine failure is a direct/indirect and/or imminent/delayed result of the occurrence of the pattern/rule. It may be conceivable that more than one pattern/rule is technically related to a certain machine failure.

In an aspect of the disclosure the technical relationship includes information about the number of repetitions of said sequential pattern/rule until the faulty behavior of the respective machine occurs, in particular occurs with a predefined probability. It is also possible to determine a confidence range for several probabilities/repetitions. The number of repetitions and the respective probabilities may be stored together with the reference sequential pattern/rule at the central database.

The aforementioned method steps are mainly for building up the central database. However, the central database according to the present disclosure can be advantageously used for regular fleet monitoring of at least one event-data-generating machine, in particular construction or hoisting machines. Thereby, an early damage detection of at least one machine is possible. Therefore, another aspect of the disclosure is directed to a method for monitoring the regular operation of at least one event-data-generating machine by way of a central database generated by the method according to the present disclosure. Said method includes the step of inspecting the received event data generated by the at least one event-data-generating machine for the occurrence of a stored reference sequential pattern. If a certain pattern is detected within the event data of at least one machine an appropriate countermeasure can be triggered to avoid further damage of the machine.

For instance, according to an aspect of the method an alarm notice, in particular a visible or audible notice, may be generated if a stored reference sequential pattern could be matched. Furthermore, the alarm notice may only be generated if the reference sequential pattern could be matched for a certain number of times within the event data received from a single event-data-generating machine. For instance if a repetition of the pattern was found within the event data according to the number of repetitions as stored with the reference pattern at the central database.

In accordance with the disclosure, the above-mentioned object is also solved by a system comprising at least one machine, in particular a construction or hoisting machine, having data logging means for producing event data and a central processing unit for monitoring said at least one machine wherein said central unit is connected to a central pattern database. In general, the system comprises means for processing the above described inventive methods. Obviously, the system shows the same advantages and properties as the inventive methods. In particular, the central unit has means for evaluation of a faulty behavior of at least one event-data-generating machine according to the present disclosure and/or means for monitoring the regular operation of at least one event-data-generating machine by way of a central database as generated by the aforementioned method. For instance the system comprises means for receiving event data from at least one of the machines, means for mining a multi-dimensional sequential pattern/rule within said received event data wherein at least one dimensional attribute holds information indicating said event-data-generating machine or at least one machine property, in particular the product family of the event-data-generating machine. The system has furthermore a respective database for storing reference sequential patterns/rules together with additional attributes such as support, confidence, and probabilities.

Further details and advantages of the present disclosure will be explained in detail with reference to an embodiment illustrated in the drawing.

FIG. 1 shows a schematic overview over the processing steps of the inventive method. It is deemed necessary to give a brief introduction into the terms of sequential rule mining in general before concentrating on the preferred embodiment of the inventive system and its inventive methods.

Sequence Database

In general, sequential rule mining consists of discovering rules in sequences. According to the present disclosure this data mining task is applied for analyzing the behavior of construction and/or hoisting machines of a machine fleet. The principal goal of pattern and rule mining is to discover useful, novel and/or unexpected patterns in databases. The mining process is applied to a so called sequences database which contains some sequences. For example, consider the following database:

| sid | Sequence |
|---|---|
| 10 | ⟨(bd)cb(ac)⟩ |
| 20 | ⟨(bf)(ce)b(fg)⟩ |
| 30 | ⟨(ah)(bf)abf⟩ |
| 40 | ⟨(be)(ce)d⟩ |
| 50 | ⟨a(bd)bcb(ade)⟩ |

This database contains five sequences referenced as sid 10, 20, 30, 40, 50. For example, the symbols "a", "b", "c", d", "e", "f" represent some items sold in a supermarket. Now, a sequence is an ordered list of sets of items. The first row in the table could be read like this: Customer having id 10 bought on one visit items b and d. On his next visit he bought c alone. Then he acquired b. His next purchase was a together with c. The first row consists of four elements: It is a 6-sequence. Item b appears two times in this sequence and contributes 2 to the length of the sequence. Nevertheless it only contributes one to support (b).

Mining Sequential Patterns in Sequences

A sequential pattern is a subsequence that appears in several sequences of a database. Referring to the above given database the sequential pattern <(bd)(cb)> appears in the first and fifth sequence of our database. This pattern is quite interesting. It indicates that customers who bought items "b", "d" together also bought items "c", "b" together afterwards. Such a pattern is said to have a support of two sequences because it appears in two sequences from the database. Several algorithms have been proposed for finding all sequential patterns in a database. These algorithms take as input a sequence database and a minimum support threshold (minsup). Then, they will output all sequential patterns having a support no less than minsup. Those patterns are said to be the frequent sequential patterns. However, an important limitation of sequential patterns is that there is no assessment of the probability that a pattern will be followed.

Basic Principle of Mining Sequential Rules in Sequences According to the Present Disclosure Sequential rule mining is an alternative to sequential pattern mining to take into account the probability that a pattern will be followed. A sequential rule is a rule of the form A→B where A and B are sets of items (itemsets) or sequences of items. A rule A→B is interpreted as if items in A occur in a certain temporal order, then they will be followed by the items in B (in a certain temporal order). For example, consider the rule (bd)→(b). It means that if a customer buys items "b" and "d", then the customer will later buy the item b once again. Consequently, the order among items in (bd) is important.

To find sequential rules, two measures are generally used: the support and the confidence. The support of a rule A→B is how many sequences contain the items from A followed by the items from B. For example, the support of the rule (bd)→(b) is 2 sequences because items "b", "d" appear before the item b in two sequences (id 10 and id 50).

The confidence of a rule A→B is the support of the rule divided by the number of sequences containing the items from A. It can be understood as the conditional probability P(B|A). For example, the confidence of the rule (bd)→(b) is 0.671 (or 67% if written as a percentage), i.e. in case a customer buys items "b", "d", he then buys "b" with a probability of 67%.

It is possible to define thresholds for the support and confidence so that the mining algorithm will output all sequential rules having a support and a confidence respectively no less than the respective thresholds.

Multi-Dimensional Sequential Pattern/Rules Mining

In the process of mining more precise and suitable sequential patterns/rules, one came up with the idea of considering more attributes in the sequential patterns/rules. This field is called Multi-Dimensional Sequential Pattern/Rules Mining.

For example, a sequence database contains transactional data. Sequential Pattern/Rules mining would dig up that a significant amount of people that buy product A is likely to buy product B within a certain time interval. Multi-Dimensional sequential pattern/rules mining tries to describe the group of people supporting this pattern/rule in more detail by adding additional attributes, such as age, profession, address, etc. Hence, groups of people having different purchasing behaviors can be detected.

PREFERRED EMBODIMENT OF THE PRESENT DISCLOSURE

In the following it is pointed out how to employ and adapt the aforementioned methods in a system for evaluating a faulty behavior of a number of machines, in particular construction or hoisting machines, having data logging means for providing event data, and for monitoring a number of machines in order to early detect a possible machine failure. Reference is now made to the FIGURE.

Data consisting of temporally ordered status information is defined as event data. Almost any type of information provided with a timestamp meets this definition. Usually, event data is recorded at an elementary level of a computer based system in order to observe its behavior. Though, there is no standard form of event data, it is often recorded in logs. Nowadays, companies and organizations generate terabytes of event data on a daily basis.

BRIEF DESCRIPTION OF THE FIGURE

FIG. 1 shows a certain number of machines, in particular construction machines or cranes, employing a data logging software on its PLC (Programmable Logic Controller) that records event data generated by running programs and sensors. This data makes it possible to monitor the status of the machine. Hence, the ability to automatically store and monitor event data records on a permanent basis has become a necessity for detecting malicious behavior, hazard states and other security issues.

DETAILED DESCRIPTION

The machines 10 stand representatively for an arbitrary number of cranes or constructing machines of a fleet. The machines 10 may be identical or rather similar. They may all belong to a common product family or similar product families.

The horizontal lines of each machine 10 stands for the whole lifetime or only a selected lifetime segment of the machine. The vertical dotted line, marked with reference sign 11, indicates a certain faulty behavior of the machine occurred at a certain point of time. The circles 12, actually having an ellipsoid form, indicate a selected time period before the occurrence of the faulty behavior 11. Generally, the circle 12 marks the time period for the logged events which should be analyzed for multidimensional sequential rules, patterns, anomalies or exceptions.

Each machine 10 sends logitems referring to logged events with a corresponding time stamp. A logitem has one type of event, one time stamp at which the event occurred and one optional detail information about the machine or event. The first essential new feature of the inventive method is that the algorithm 20 performed at the central processing unit mines the transmitted logitems not only for (maximal) sequential patterns, but also for sequential rules, anomalies and exceptions. To enable sequential rules mining in block 20 the event data has to be transformed into a sequence database firstly. In addition, the mined patterns consist only of logitems that have been triggered within a predefined time window w. It is to remark, that w is not the same as 12. That is, a sequence of items can only be a candidate for one of the above patterns if the difference of the time stamps of the last and first logitem is less than or equal to the length of the predefined time window. An anomaly is to be understood as a deviation from an ordinary behavior. An exception is understood as a variation of an ordinary behavior caused by a certain influence.

The order of occurrence of the logitems must always be taken into account in each of the above-mentioned patterns. For example, a sequence rule may describe two different operations depending on the order of the logitems. The following sequence rule is considered: (Motor fault)→(temperature cooling liquid high). Since a motor fault occurs firstly and the temperature of the cooling liquid increases afterwards, it can be assumed, for example, that the motor is configured incorrectly. The fault is probably on the motor side. If, however, the sequence of the logitems of this sequence rule is interchanged, it is obtain: (Temperature coolant high)→(motor error). In this case, a cooling circuit problem is likely, since a signal indicating a high temperature of the cooling liquid is received firstly. It is very likely that the engine fault is triggered by the cooling circuit problem. Consequently, if the order of the logitems is not considered, a sequence rule or actual situation may be interpreted incorrectly. Analogously, the sequence of the logitems must also be taken into account in the remaining above-mentioned patterns.

The second essential feature is a cross-machine, multidimensional search for patterns on machines 10 with a known faulty behavior 11 in order to recognize this behavior on the machines 10 early enough. A pattern is to be understood as above. The data on a faulty behavior can, for instance, be obtained from the failure data of the machines which are found in the warranty claims of these machines and/or from the machine logitems. For example, a triggered error logitem may indicate a problem on the machines.

This cross-machine, multi-dimensional search is performed according to the following procedure: Machines 10 which show a certain faulty behavior 11 (for example problems/failures) within a predefined time period or in general until the present time are selected firstly. Afterwards, the logitems generated by the selected machines 10 and which have been triggered before the certain behavior and/or between two or several occurrences of the behavior are chosen for subsequent mining in block 20. Next, a time window w needs to be defined and the algorithm 20 searches in all of the selected periods 12 for common patterns, (maximum) sequential pattern, sequential rules, anomalies and exceptions, which occurred at the selected machines 10 prior to the appearance of a faulty behavior 11. The resulting patterns may only consist of logitems which had been logged within the predefined time window w.

By means of statistical evaluations (confidence, frequency, . . . ) sample pattern candidates 21 are evaluated which have been found before the appearance of the certain faulty behavior 11. The samples pattern candidates 21 found should then be either automatically or manually evaluated by a technical specialist in block 22. The specialist decides which patterns 21 show a technical relation to the certain behavior, i.e. which patterns 21 directly cause the subsequent faulty behavior 11.

If the specialist does not recognize a technical relationship between the pattern and the appearance of the faulty behavior the pattern is either discarded or alternatively stored within the database 30. The latter could be the case if the specialist considers the pattern important for a different machine behavior. In this case, the pattern could still be used as a reference pattern in the database 30.

The patterns 21 which have been found to show a direct technical relationship with the inspected faulty behavior 11 are analyzed more closely. The number of pattern repetitions before the faulty behavior 11 actually appears with a predefined minimum support and/or minimum confidence is determined by way of statistical evaluations. Further, confidence intervals may be determined for the number of repetitions. The pattern candidate 21 is stored as a reference pattern together with its determined number of repetitions and confidence intervals within the database 30.

From then on, these stored reference patterns 21 are monitored by pattern matching 40 on all machines of a machine fleet. If a sufficient frequent occurrence of a reference pattern is detected with the logitems generated by all monitored machines, an early warning 50 is triggered. The described analysis is continually carried out as new data arrives.

A simple practical example can be briefly summarized as follows. A pattern found in connection with the failure of the bolt at the hinging point of the boom results in the sequential rule (overload load torque limitation)→(pressure in the cylinder too high). If this pattern occurs for a certain number of repetitions, it can be expected that the bolt is damaged soon.

A third aspect of the disclosed present disclosure is the evaluation of a more accurate and better error image about a known faulty behavior. In this regard, multidimensional cross-machine pattern search is only conducted for selected machines that show said faulty behavior at least once. However, the algorithm considers only logitems occurred during a switching-on cycle of the machine in which the faulty behavior has been triggered at least once. The patterns to be searched for and the method are as previously described. For instance, sometimes a critical message of motor errors is indicated on the machines. In this case, the method especially searches for patterns during the switching-on cycles of said machines having the aforementioned concrete motor error. Thereby, for example, it may be asserted that 60% of the affected machines show the rule (temperature cooling liquid too high)→(Engine Fault) and 40% of the affected machines show the rule (oil level below minimum)→(engine error). Thus, a more detailed fault pattern is achieved that can help with troubleshooting.

The invention claimed is:

1. A method for evaluation of faulty behavior of at least one event-data-generating machine including a data logging device for providing event data, the method comprising:
transferring logged event data, the logged event data representing a sequence of events in a defined time period of a machine fault or failure, from the at least one event-data-generating machine to a central processor;
mining multi-dimensional sequential rules and mining multi-dimensional to sequential patterns within the logged event data, wherein the logged event data additionally comprises at least one dimensional attribute holding information indicating the event-data-generating machine or at least one event-data-generating machine property, and wherein a multi-dimensional sequential rule defines that a second set of at least one event in the defined time period of the machine fault or failure will follow a first set of at least one event in the defined time period of the machine fault or failure, if the first set of at least one event occurs; and
storing at least one reference sequential rule as an output of the mined multi-dimensional sequential rules in a central database.

2. The method according to claim 1, wherein a single event of the logged event data consists of at least an information field: event ID, timestamp, type of event, and Boolean values or values cohering with the event.

3. The method according to claim 1, wherein the logged event data is transformed to a sequence database by multiple splitting of a long sequence of event data into at least two subsequences, and wherein the multiple splitting is triggered by a machine restart and/or a certain pause between two subsequent events.

4. The method according to claim 1, wherein the step of mining multi-dimensional sequential rules identifies sequential rules which are combinations of events/event sets that appear with a minimum frequency and a minimum confidence within the mined, logged event data.

5. The method according to claim 4, wherein a difference between timestamps of a first event and a last event included in an identified sequential rule does not exceed a predefined time window.

6. The method according to claim 1, wherein the at least one reference sequential rule is stored in the central database in case an individual sequential rule does not match to an existing sequential rule already stored in the central database.

7. The method according to claim 1, wherein the logged event data is additionally mined for multi-dimensional sequential patterns and/or anomalies and/or exceptions.

8. The method according to claim 1, wherein the method considers only event data generated by multiple machines showing a same faulty behavior.

9. The method according to claim 8, wherein the method considers only event data generated by event-data-generating machines showing identical or similar faulty behavior for mining multi-dimensional sequential rules and/or mining multi-dimensional sequential patterns and/or mining anomalies and/or exceptions.

10. The method according to claim 9, wherein the method considers only event data generated by at least one event-data-generating machines showing identical or similar faulty behavior during its switch-on cycle.

11. The method according to claim 1, wherein, before the step of storing at least one reference sequential rule, a technical relationship between a rule candidate and a faulty behavior of the event-data-generating machine is determined.

12. The method according to claim 8, wherein the logged event data showing a faulty behavior is a certain failure of at least one machine component and/or a creation of at least one error message.

13. The method according to claim 11, wherein a technical relationship between a sequential pattern and the faulty behavior defines a number of repetitions of the sequential rule until the faulty behavior of the respective event-data-generating machine occurs.

14. The method according to claim 13, wherein the number of repetitions and a probability is stored together with a reference sequential pattern at the central database.

15. The method according to claim 13, wherein the faulty behavior of the respective event-data-generating machine occurs with a predefined probability.

16. A method for monitoring regular operation of at least one event-data-generating machine by way of a central database generated by a method for evaluation of faulty behavior of the at least one event-data-generating machine, including a data logging device for providing event data, the method comprising:
transferring logged event data, the logged event data representing a sequence of events in a defined time period of a machine fault or failure, from the at least one event-data-generating machine to a central processor;
mining multi-dimensional sequential rules and mining multi-dimensional sequential patterns within the logged event data, a sequential rule defining that a second set of at least one event in the defined time period of the machine fault or failure will follow a first set of at least one event in the defined time period of the machine fault or failure, if the first set of at least one event occurs, wherein the logged event data additionally comprises at least one dimensional attribute holding information indicating the event-data-generating machine or at least one event-data-generating machine property;
storing at least one reference sequential rule as an output of the mined multi-dimensional sequential rules in the central database; and
inspecting received event data generated by the at least one event-data-generating machine for an occurrence of a stored reference sequential rule.

17. The method according to claim 16, wherein the multi-dimensional sequential rules define an order of the sequence of events, and the method further generates an alarm notice if the stored reference sequential rule is matched to the received event data generated by the at least one event-data-generating machine.

18. The method according to claim 17, wherein the alarm notice is generated if the reference sequential rule is matched for a certain number of times within the event data received from a single event-data-generating machine.

19. The method according to claim 18, wherein the alarm notice is generated if the reference sequential rule is matched during a time window, wherein the reference sequential rule is matched for at least a number of iterations as stored together with the reference sequential rule at the central database.

20. The method of claim 16, wherein the logged event data represents a sequence of events in a defined time period of a same fault or failure occurring in multiple machines.

* * * * *